UNITED STATES PATENT OFFICE.

ERNEST DU PONT, OF WILMINGTON, DELAWARE, ASSIGNOR TO THE E. I. DU PONT DE NEMOURS POWDER COMPANY, OF WILMINGTON, DELAWARE, A CORPORATION OF NEW JERSEY.

PROCESS OF INCORPORATING INGREDIENTS OF EXPLOSIVES.

976,211.  Specification of Letters Patent.  Patented Nov. 22, 1910.

No Drawing. Application filed November 16, 1907, Serial No. 402,482. Renewed April 19, 1910. Serial No. 556,396.

*To all whom it may concern:*

Be it known that I, ERNEST DU PONT, a citizen of the United States, residing at Wilmington, county of Newcastle, and State of Delaware, have invented a new and useful Improvement in Processes of Incorporating Ingredients of Explosives, of which the following is a full, clear, and exact description.

It is quite advantageous that the incorporation of the ingredients used, in the manufacture of explosives, should be while the materials are in a wet state in order to minimize the danger of explosion and to keep the incorporating surface free from the material. For incorporation a porcelain barrel charged with balls has been generally used. Water also has been used to maintain the ingredients in a moist condition. Water cannot, however, be used with many ingredients, for the reason that many ingredients are affected by water, some being affected to the extent of being dissolved.

I have discovered that if I use a volatile liquid hydrocarbon, such, for instance, as gasolene, kerosene or benzene, preferably gasolene, I can maintain in a moist condition any ingredient or ingredients which are detrimentally affected by the water, such, for instance, as trinitro-anisol, or which are soluble in water, such for instance, as barium nitrate, ammonium picrate, etc. I have found with the volatile liquid hydrocarbons these ingredients are maintained in a moist condition without being dissolved or detrimentally affected. I thus am enabled to incorporate these ingredients in a moist condition with the consequent safety of incorporation and maintaining the incorporating surfaces of the machine free from the ingredients. With the use of such volatile liquid hydrocarbons, I have also found that the time of incorporation is much shortened, and this is true whether the ingredients used be affected or not affected by water, or be soluble or insoluble in water. The hydrocarbons used being of less specific gravity, the action of the balls in the ordinary incorporating machine, is much stronger. Hence my improved process of incorporation has advantages whether the ingredients be soluble or insoluble in water, or detrimentally affected or not by water. After the incorporation, the volatile hydrocarbon may be driven off by heat or the excess of hydrocarbon may be separated in a centrifugal machine and the remainder driven off by heat.

As an example of my proposed process, I mix together forty (40) parts nitro cellulose, twenty (20) parts tri-nitro-anisol, thirty (30) parts nitroglycerin, and ten (10) parts of charcoal. Of these ingredients the tri-nitro anisol, while perhaps not soluble in water, is detrimentally affected thereby. I have also added to these ingredients barium nitrate which is soluble in water. In such case the ingredients and percentage of ingredients may be tri-nitro-anisol 35%, nitro-cellulose 45%, barium nitrate 15%, nitroglycerin 5%. After such mixing, the ingredients are placed in the ordinary incorporating machine, a porcelain barrel, in which are porcelain balls. In this barrel is placed sufficient gasolene to bring the mass to a liquid consistency. Incorporation is then proceeded with in the ordinary manner. When the incorporation is completed, as stated before, the excess of gasolene is separated out in a centrifugal machine, and the incorporated powder subjected to heat sufficient to volatilize and drive off the remaining gasolene. The gasolene may, if desired, be recovered in the ordinary manner.

Having now fully described my invention, what I claim and desire to protect by Letters Patent is:

1. The improvement in the method of incorporating ingredients of explosives, which consists in maintaining said ingredients, while incorporating, suspended in a volatile liquid hydrocarbon in which the ingredients are insoluble.

2. The improvement in the method of incorporating ingredients of explosives, which consists in maintaining said ingredients, while incorporating, suspended in a volatile liquid hydrocarbon in which the ingredients are insoluble, and after incorporation removing said hydrocarbon.

3. The improvement in the method of incorporating ingredients of explosives, insoluble in gasolene, which consists in maintaining said ingredients, while incorporating, suspended in gasolene.

4. The improvement in the method of incorporating ingredients of explosives, insoluble in gasolene, which consists in maintaining said ingredients, while incorporating, suspended in gasolene, and after incorporation removing said gasolene.

5. The improvement in the method of incorporating ingredients of an explosive, one of which is affected by water, which consists in maintaining said ingredients, while incorporating, suspended in a volatile liquid hydrocarbon in which the ingredients are insoluble.

6. The improvement in the method of incorporating ingredients of an explosive, one of which is affected by water, which consists in maintaining said ingredients, while incorporating, suspended in a volatile liquid hydrocarbon in which the ingredients are insoluble, and after incorporation removing said hydrocarbon.

7. The improvement in the method of incorporating ingredients of an explosive, a plurality of which are affected by water, which consists in maintaining said ingredients, while incorporating, suspended in a volatile liquid hydrocarbon in which said ingredients are insoluble.

8. The improvement in the method of incorporating ingredients of an explosive, a plurality of which are affected by water, which consists in maintaining said ingredients, while incorporating, suspended in a volatile liquid hydrocarbon in which said ingredients are insoluble, and after incorporation removing said hydrocarbon.

9. The improvement in the method of incorporating ingredients of an explosive, insoluble in gasolene, one of which is affected by water, which consists in maintaining said ingredients, while incorporating, suspended in gasolene.

10. The improvement in the method of incorporating ingredients of an explosive, insoluble in gasolene, one of which is affected by water, which consists in maintaining said ingredients, while incorporating, suspended in gasolene, and after incorporation removing said gasolene.

11. The improvement in the method of incorporating ingredients of an explosive, insoluble in gasolene, a plurality of which are affected by water, which consists in maintaining said ingredients, while incorporating, suspended in gasolene.

12. The improvement in the method of incorporating ingredients of an explosive, insoluble in gasolene, a plurality of which are affected by water, which consists in maintaining said ingredients, while incorporating, suspended in gasolene, and after incorporation removing said gasolene.

In testimony of which invention, I have hereunto set my hand, at Philadelphia, on this 12th day of November, 1907.

ERNEST DU PONT.

Witnesses:
M. M. HAMILTON,
A. M. URIAN.